US006884852B1

(12) United States Patent
Klauck et al.

(10) Patent No.: US 6,884,852 B1
(45) Date of Patent: Apr. 26, 2005

(54) POLYURETHANE AND PREPARATION CONTAINING POLYURETHANE

(75) Inventors: Wolfgang Klauck, Meerbusch (DE); Lydia Duhm, Duesseldorf (DE); Martin Majolo, Erkelenz (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/646,813

(22) PCT Filed: Mar. 17, 1999

(86) PCT No.: PCT/EP99/01728

§ 371 (c)(1),
(2), (4) Date: Nov. 27, 2000

(87) PCT Pub. No.: WO99/48942

PCT Pub. Date: Sep. 30, 1999

(30) Foreign Application Priority Data

Mar. 25, 1998 (DE) .......................... 198 13 202

(51) Int. Cl.⁷ .......................... C08L 75/08; C08G 18/48; C08G 18/38; C08G 18/61
(52) U.S. Cl. .................... 525/458; 525/457; 525/460; 528/28; 528/76
(58) Field of Search ................ 525/457, 458, 525/460; 528/28, 76

(56) References Cited

U.S. PATENT DOCUMENTS 3,278,457 A    10/1966   Milgrom ..................... 528/412
3,979,344 A    9/1976    Bryant et al. ................. 528/22
4,798,878 A    1/1989    Brinkmann et al. ........... 528/28
4,857,623 A    8/1989    Emmerling et al. ........... 528/28
4,985,491 A    1/1991    Reisch ......................... 524/875
5,670,601 A  * 9/1997    Allen et al. .................... 528/76
5,990,257 A  * 11/1999   Johnston et al. .............. 528/28
6,255,434 B1 * 7/2001    McGraw et al. .............. 528/92

FOREIGN PATENT DOCUMENTS

| CA | 836 076 | 3/1970 |
| DE | 25 51 275 | 5/1976 |
| EP | 0 170 865 | 2/1986 |
| EP | 0 261 409 | 3/1988 |
| EP | 0 372 561 | 6/1990 |
| EP | 0 425 694 | 5/1991 |
| EP | 0 748 828 | 12/1996 |
| WO | WO96/38453 | 12/1996 |

* cited by examiner

*Primary Examiner*—Rabon Sergent
(74) *Attorney, Agent, or Firm*—Stephen D. Harper; Glenn E. J. Murphy

(57) ABSTRACT

A polyurethane is produced by reacting at least components A and B, where a) a polyisocyanate or mixture of polyisocyanates is used as component A and b) a polyol or mixture of polymer is used as component B. Component B contains at least one polyether having a number average molecular weight of at least 4000 and a polydispersity of less than 1.5 and/or an OH functionality of between about 1.8 and about 2. Preparations containing such polyurethanes are useful as adhesives, coatings and sealants.

22 Claims, No Drawings

POLYURETHANE AND PREPARATION CONTAINING POLYURETHANE

BACKGROUND OF THE INVENTION

1. Field of the Invention

This invention relates to polyurethanes which can be produced using polyethers with a particularly narrow molecular weight distribution (polydispersity, PD) or a particular OH functionality or both, to preparations which contain polyurethanes such as these and to the use of the polyurethanes and preparations containing them.

2. Discussion of the Related Art

As multipurpose plastics, polyurethanes are used in many areas of technology, above all in surface coating compositions, adhesives and sealing compounds. Polyurethanes with reactive terminal groups, particularly terminal groups capable of reacting with water, are of particular interest in this regard. This form of reactivity enables the reactive polyurethanes to be brought to the required place in the required processable form, generally liquid or highly viscous, and cured by the addition of water or other compounds reactive with the terminal groups (hardeners, for example in the case of two-component systems). The hardener is generally added before processing, the processing time available to the processor after addition of the hardener being limited. However, polyurethanes containing reactive terminal groups may also be cured solely by reaction with atmospheric moisture, i.e. without the addition of hardeners (one-component systems). One-component systems generally have the advantage over two-component systems that the user is spared the frequently onerous task of mixing the often viscous components before use.

The polyurethanes containing reactive terminal groups commonly used in one-component and two-component systems include, for example, polyurethanes terminated by NCO groups. Given suitable functionality, polyurethanes such as these cure solely under the effect of atmospheric moisture. In certain circumstances, particularly in the presence of water (for example on moist surfaces), the use of NCO-terminated polyurethanes can be accompanied by the evolution of carbon dioxide which can have adverse affects, for example on surface structure. In addition, polyurethanes such as these often do not adhere to smooth inert surfaces, for example to surfaces of glass, ceramics, metals and the like, which in many cases necessitates the use of a primer before application of the polyurethane or makes the polyurethanes impossible to use for sealing, bonding or for sealing a surface of those materials.

In order to remedy this situation, i.e. to enable a firm and durable bond to be established between the polyurethane and, for example, the surfaces mentioned above, it has been proposed to introduce an alkoxysilane group, for example, into the polyurethane as a reactive terminal group.

Thus, CA-B 836 076, for example, describes polymers crosslinkable at room temperature which cure on exposure to atmospheric moisture. Among the polymers described as suitable for this purpose are polymers which contain at least two urethane bonds (polyurethanes), the isocyanate functions originally present having been reacted with an alkoxysilane compound. The alkoxysilane compound contains an isocyanate-reactive hydrogen atom and has at least one hydrolyzable alkoxy group at the Si atom which, although stable under the reaction conditions, can be hydrolyzed by moisture. The polyurethanes described as suitable include, for example, a product of a polyoxyalkylene polyol and an aromatic polyisocyanate.

EP-A 0 170 865 describes a process for the production of coating, sealing and adhesive compositions stable in storage in the absence of moisture. To this end, NCO-terminated polyether urethanes are reacted with amino- or mercapto-functional alkoxysilanes containing at least two ether oxygen atoms in at least one alkoxy group to form prepolymeric silanes.

DE-A 25 51 275 describes an automobile sealing compound which cures solely via terminal alkoxysilane groups. The end product of this process is extremely hard.

EP-B 0 261 409 describes a process for the production of alkoxysilane-terminated moisture-curing polyurethanes in which diols and/or triols are reacted with diisocyanates to form NCO-terminated polyurethane prepolymers of which the functionality is subsequently adjusted to a value of 1 to 2 and the polyurethane prepolymers thus obtainable are reacted with corresponding organosilicone compounds to form alkoxysilane-terminated polyurethanes.

A general disadvantage of all moisture-curing polyurethanes or preparations (systems) containing them, but especially the silicon-containing systems, is that, after processing, the systems become brittle as a result of the curing process and, accordingly, lose a large part of their elasticity or show poor tear propagation resistances. The loss of elasticity occurs particularly frequently at low temperatures, the known systems often losing their elasticity and flexibility on cooling. Unfortunately, attempts to improve the elasticity and flexibility of the cured systems often result in a deterioration in other properties, for example greater surface tackiness, or alternatively the systems have such a high viscosity before processing that solvents, for example, have to be used to guarantee processability. A reduction in the shelf life of the systems is also observed in many cases. Both the deterioration in key material or storage properties and the use of solvents are economically and ecologically inappropriate.

The term "polyurethane" in the following text stands for a particular polyurethane structure which can be obtained by a controlled single-stage or multistage polyurethane synthesis. The term encompasses any deviations from this structure arising out of the statistical nature of the polyaddition process.

The term "preparation" in the context of the present invention stands for mixtures containing a "polyurethane" or a mixture of two or more "polyurethanes" as defined above and optionally other additives which may either be present from the polyurethane synthesis (solvents, catalysts) or which have been subsequently added to the polyurethane or to the mixture of two or more polyurethanes (for example plasticizers, reactive diluents, fillers and the like).

SUMMARY OF THE INVENTION

Accordingly, the problem addressed by the present invention was to provide a polyurethane which would not have any of the disadvantages mentioned above when used with reactive terminal groups. More particularly, the problem addressed by the present invention was to provide a polyurethane which would be crosslinkable or curable through one or more alkoxysilane groups, but which nevertheless would show excellent elasticity, flexibility and tear propagation resistance, even at low temperatures. Another problem addressed by the present invention was to provide a preparation which would contain a polyurethane according to the invention and of which the viscosity would provide for favorable processability. Yet another problem addressed by the present invention was to provide a preparation which, despite it low viscosity, would guarantee the crosslinked or cured product favorable properties, particularly high stability in the presence of UV radiation or water on glass surfaces.

It has now been found that polyurethanes which have been produced using polyethers with a molecular weight ($M_n$) of at least 4,000 and a polydispersity PD ($M_w/M_n$) of less than 1.5 or using polyethers with a molecular weight ($M_n$) of at least 4,000 and an OH functionality of about 1.8 to 2.0 or using polyethers with all the features mentioned and preparations containing such polyurethanes do not have any of the above-mentioned disadvantages of the prior art.

Accordingly, the present invention relates to a polyurethane obtainable by reacting at least two components A and B,
a) a polyisocyanate or a mixture of two or more polyisocyanates being used as component A and
b) a polyol or a mixture of two or more polyols being used as component B, characterized in that component B contains a polyether with a molecular weight ($M_n$) of at least 4000 and
c) a polydispersity PD ($M_w/M_n$) of less than 1.5 or
d) an OH functionality of about 1.8 to 2.0 or
e) a polydispersity PD ($M_w/M_n$) of less than 1.5 and an OH functionality of about 1.8 to about 2.0
or a mixture of two or more such polyethers.

DETAILED DISCUSSION OF THE INVENTION

According to the invention, a polyisocyanate or a mixture of two or more polyisocyanates is used as component A. Polyisocyanates in the context of the invention are understood to be compounds which contain at least two isocyanate groups (NCO groups). In general, these are compounds with the general structure O=N=C—Z—C=N=O, where Z is a linear or branched aliphatic, alicyclic or aromatic hydrocarbon radical which may optionally contain other inert substituents or substituents participating in the reaction.

Polyisocyanates suitable for use as component A in accordance with the invention are, for example, ethylene diisocyanate, 1,4-tetramethylene diisocyanate, 1,4-tetramethoxybutane diisocyanate, 1,6-hexamethylene diisocyanate (HDI), cyclobutane-1,3-diisocyanate, cyclohexane-1,3- and -1,4-diisocyanate, bis-(2-isocyanatoethyl)-fumarate and mixtures of two or more thereof, 1-isocyanato-3,3,5-trimethyl-5-isocyanatomethyl cyclohexane (isophorone diisocyanate, IPDI), 2,4- and 2,6-hexahydrotoluene diisocyanate, hexahydro-1,3- or -1,4-phenylene diisocyanate, benzidine diisocyanate, naphthalene-1,5-diisocyanate, 1,6-diisocyanato-2,2,4-trimethylhexane, 1,6-diisocyanato-2,4,4-trimethylhexane, xylylene diisocyanate (XDI), tetramethyl xylylene diisocyanate (TMXDI), 1,3- and 1,4-phenylene diisocyanate, 2,4- or 2,6-toluene diisocyanate (TDI), 2,4'-diphenylmethane diisocyanate, 2,2'-diphenylmethane diisocyanate or 4,4'-diphenylmethane diisocyanate (MDI) or partly or completely hydrogenated cycloalkyl derivatives thereof, for example completely hydrogenated MDI ($H_{12}$-MDI), alkyl-substituted diphenylmethane diisocyanates, for example mono-, di-, tri- or tetraalkyl diphenylmethane diisocyanate and partly or completely hydrogenated cycloalkyl derivatives thereof, 4,4'-diisocyanatophenyl perfluoroethane, phthalic acid-bis-isocyanatoethyl ester, 1-chloromethyl-phenyl-2,4- or -2,6-diisocyanate, 1-bromomethylphenyl-2,4- or -2,6-diisocyanate, 3,3'-bis-chloromethylether-4,4'-diphenyl diisocyanate, sulfur-containing diisocyanates obtainable by reacting 2 moles of diisocyanate with 1 mole of thiodiglycol or dihydroxydihexyl sulfide, the diisocyanates and triisocyanates of dimer and trimer fatty acids or mixtures of two or more of the diisocyanates mentioned.

Other polyisocyanates suitable for use in accordance with the invention for the production of component A are isocyanates with a functionality of three or more obtainable, for example, by oligomerization of diisocyanates, more particularly by oligomerization of the isocyanates mentioned above. Examples of such tri- and higher isocyanates are the triisocyanurates of HDI or IPDI or mixtures thereof or mixed triisocyanurates thereof and polyphenyl methylene polyisocyanate obtainable by phosgenation of aniline/formaldehyde condensates.

In one particularly preferred embodiment of the present invention, TDI and MDI are used as component A.

According to the invention, component B is a polyol or a mixture of two or more polyols, component B containing a polyether with a molecular weight ($M_n$) of at least 4,000 and
c) a polydispersity PD ($M_w/M_n$) of less than 1.5 or
d) an OH functionality of about 1.8 to 2.0 or
e) a polydispersity PD ($M_w/M_n$) of less than 1.5 and an OH functionality of about 1.8 to about 2.0
or a mixture of two or more such polyethers.

It has been found that, where polyethers such as these are used in the production of polyurethanes, particularly elastic and flexible polyurethanes with favorable material properties, even after curing, can be obtained.

In the context of the present invention, the term "polyol" stands for a compound which contains at least two OH groups, irrespective or whether the compound contains other functional groups. However, a polyol used in accordance with the present invention preferably contains only OH groups as functional groups or, if other functional groups are present, none of these other functional groups is reactive at least to isocyanates under the conditions prevailing during the reaction of components A and B.

In one preferred embodiment, the polyethers suitable for use in component B in accordance with the present invention have a PD ($M_w/M_n$) of less than about 1.48. In one particularly preferred embodiment, the PD is less than about 1.45 and, most preferably, less than about 1.4. Particularly preferred polyethers have a polydispersity of about 1.01 to about 1.3 and, more particularly, in the range from about 1.05 to about 1.18, for example about 1.08 to about 1.11 or about 1.12 to about 1.14.

In another preferred embodiment of the invention, component B contains a polyether with a molecular weight ($M_n$) of at least about 4,000 and an average OH functionality (average number of OH groups per polyether molecule) of at least about 1.8 to about 2 and preferably about 1.9 to about 2.0. In one particularly preferred embodiment, the OH functionality of the polyether is about 1.93 to about 2.0 and, more particularly, about 1.95 or about 1.98 to about 2.0. In another preferred embodiment, component B consists of such a polyether or a mixture of two or more such polyethers. In other words, the functionality of component B as a whole has one of the values mentioned above.

The polyethers to be used in accordance with the invention are obtained in known manner by catalyzed reaction of a starter compound containing at least one reactive hydrogen atom with alkylene oxides, for example ethylene oxide, propylene oxide, butylene oxide, styrene oxide, tetrahydrofuran or epichlorohydrin or mixtures of two or more thereof. In order to obtain the particularly narrow molecular weight distributions (PD) required for the purposes of the present invention, so-called DMC catalysis, for example with zinc hexacyanocobaltate, as described for example in U.S. Pat. No. 3,278,457, has proved to be particularly effective.

The polyethers used in the polyurethane according to the invention are preferably prepared using propylene oxide.

Suitable starter compounds are, for example, water, ethylene glycol, 1,2- or 1,3-propylene glycol, 1,4- or 1,3-butylene glycol, hexane-1,6-diol, octane-1,8-diol, neopentyl glycol, 1,4-hydroxymethyl cyclohexane or 2-methylpropane-1,3-diol.

In one preferred embodiment of the invention, the polyethers have a molecular weight ($M_n$) of about 5,000 to about 30,000 and, more particularly, in the range from about 6,000 to about 20,000. Favorable results are obtained, for example, with molecular weights of about 8,000 to about 15,000, for example of the order of 11,000, 12,000 or 13,000.

The polyols to be used in accordance with the invention have an OH value of preferably about 5 to about 15 and, more preferably, of about 10. The percentage content of primary OH groups should be below about 20%, based on all the OH groups, and is preferably below 15%. In one particularly advantageous embodiment, the acid value of the polyethers used is below about 0.1, preferably below 0.05 and, more preferably, below 0.02.

Besides the polyethers already described, component B used in accordance with the present invention may contain other polyols.

For example, component B may contain polyester polyols with a molecular weight of about 200 to about 30,000. For example, component B may contain polyester polyols obtained by reacting low molecular weight alcohols, more particularly ethylene glycol, diethylene glycol, neopentyl glycol, hexanediol, butanediol, propylene glycol, glycerol or trimethylol propane, with caprolactone. Also suitable as polyhydric alcohols for the production of polyester polyols are 1,4-hydroxymethyl cyclohexane, 2-methylpropane-1,3-diol, butane-1,2,4-triol, triethylene glycol, tetraethylene glycol, polyethylene glycol, dipropylene glycol, polypropylene glycol, dibutylene glycol and polybutylene glycol.

Other suitable polyester polyols can be obtained by polycondensation. Thus, dihydric and/or trihydric alcohols may be condensed with less than the equivalent quantity of dicarboxylic acids and/or tricarboxylic acids or reactive derivatives thereof to form polyester polyols. Suitable dicarboxylic acids are, for example, succinic acid and higher homologs thereof containing up to 16 carbon atoms, unsaturated dicarboxylic acids, such as maleic acid or fumaric acid, and aromatic dicarboxylic acids, particularly the isomeric phthalic acids, such as phthalic acid, isophthalic acid or terephthalic acid. Suitable tricarboxylic acids are, for example, citric acid or trimellitic acid. Polyester polyols of at least one of the dicarboxylic acids mentioned and glycerol which have a residual OH group content are particularly suitable for the purposes of the invention. Particularly suitable alcohols are hexanediol, ethylene glycol, diethylene glycol or neopentyl glycol or mixtures of two or more thereof. Particularly suitable acids are isophthalic acid or adipic acid and mixtures thereof.

High molecular weight polyester polyols include, for example, the reaction products of polyhydric, preferably dihydric alcohols (optionally together with small quantities of trihydric alcohols) and polybasic, preferably dibasic, carboxylic acids. Instead of free polycarboxylic acids, the corresponding polycarboxylic anhydrides or corresponding polycarboxylic acid esters with alcohols preferably containing 1 to 3 carbon atoms may also be used (where possible). The polycarboxylic acids may be aliphatic, cycloaliphatic, aromatic and/or heterocyclic. They may optionally be substituted, for example by alkyl groups, alkenyl groups, ether groups or halogens. Suitable polycarboxylic acids are, for example, succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acid or trimer fatty acid or mixtures of two or more thereof. Small quantities of mono-functional fatty acids may optionally be present in the reaction mixture.

Pure or mixed alkylene oxide adducts of the polyester polyols are also suitable.

Alkylene oxide adducts in the context of the present invention are the reaction products of the polyols mentioned with $C_{1-10}$ alkylene oxides, for example ethylene oxide, propylene oxide, butylene oxide, styrene oxide, tetrahydrofuran or epichlorohydrin or mixtures of two or more thereof. By "pure" alkylene oxide adducts are meant the reaction products with only one type of alkylene oxide whereas "mixed" alkylene oxide adducts are understood to be the reaction products with two or more types of alkylene oxides.

Also suitable for use in component B are, for example, polyethers which have been modified by polymers. Products such as these are obtainable, for example, by polymerizing styrene, acrylonitrile, vinyl acetate, acrylates or methacrylates or mixtures of two or more thereof in the presence of polyethers.

As already mentioned, lactone polyols and alkylene oxide adducts thereof are suitable for use in component B. Lactone polyols may be prepared, for example, by reaction of a lactone, for example ε-caprolactone, with a polyfunctional initiator, for example a polyhydric alcohol, an amine or an aminoalcohol. The reaction may optionally be carried out in the presence of an alkylene oxide or a mixture of two or more alkylene oxides.

Also suitable for use in component B are, for example, polyalkanolamines and pure or mixed alkylene oxide adducts thereof, non-reducing sugars and sugar derivatives and pure or mixed alkylene oxide adducts thereof, pure or mixed alkylene oxide adducts of aniline/formaldehyde condensates and polyphenols, isocyanate-reactive fats and fatty derivatives, for example castor oil, and pure or mixed alkylene oxide adducts thereof, vinyl polymers containing two or more OH groups and pure or mixed alkylene oxide adducts thereof. According to the invention, therefore, component B may contain one or more polyol components although at least one polyether with a molecular weight (Mn) of at least 4,000 and c) a polydispersity PD ($M_w/M_n$) of less than 1.5 or
d) an OH functionality of about 1.8 to about 2.0 or
e) a polydispersity PD ($M_w/M_n$) of less than 1.5 and an OH functionality of about 1.8 to 2.0 makes up at least 80% by weight of component B. In a preferred embodiment of the invention, the percentage content of this polyether or a mixture of two or more such polyethers is at least about 90% by weight or preferably higher.

The OH value of component B is advantageously about 7 to about 30 and, more particularly, about 9 to about 20, for example about 10, 11, 12, 14, 16 or 18 mg KOH/g.

To produce the polyurethane, component A is reacted with component B under conditions typically encountered in polyurethane chemistry, generally in the presence of catalysts.

In one particularly preferred embodiment of the invention, the polyurethane according to the invention has at least one, but preferably at least two terminal groups reactive to water after the reaction. To this end, component A and component B are reacted in such quantities that the ratio of NCO groups in component A to OH groups in component B is greater than 1. In a particularly preferred embodiment, the polyurethane contains an NCO group or an alkoxysilane group as the terminal group reactive to water. If the polyurethane contains two or more terminal groups reactive to water, it may contain, for example, several NCO groups, several identical or different alkoxysilane groups or mixtures of NCO groups and alkoxysilane groups.

The ratio of NCO groups to OH groups is preferably adjusted so that the polyurethane according to the invention has a molecular weight ($M_n$) of at least about 8,000 and preferably more than about 20,000 to about 40,000.

A polyurethane molecule according to the invention may advantageously contain at least about four urethane groups. If the polyurethane molecule according to the invention contains NCO groups, the number of NCO groups per molecule in one preferred embodiment is about 1.5 to about 3 and, more particularly, about 1.8 to about 2.2.

In another preferred embodiment of the invention, the polyurethane according to the invention contains—laterally or terminally to the polymer backbone—a group corresponding to general formula I:

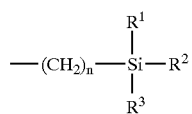

(I)

in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group and n is a number of 1 to 8.

To produce the polyurethane according to the invention containing one or more of the terminal groups mentioned above, the reaction of components A and B is carried out, for example, in the presence of a component C, component C being
f) a compound corresponding to general formula II:

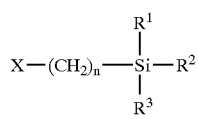

(II)

in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group and X is a group reactive to an isocyanate group or a glycidyl group and n is a number of 1 to 8.

However, components A and B may also be initially reacted with one another to form a prepolymer so that an adequate number of terminal NCO groups is formed and the prepolymer thus obtained may subsequently be reacted with component C. In this case, component C can contain only one compound corresponding to general formula II although it can equally well contain a mixture of two or more compounds corresponding to general formula II.

In general formula II, X preferably stands for —SH, —$NHR^4$, —$(NH-CH_2-CH_2)_m$—$NHR^4$ or glycidyl, $R^4$ for example representing hydrogen or a linear or branched, aliphatic or cycloaliphatic or aromatic $C_{1-10}$ hydrocarbon radical optionally substituted by another functional group inert to isocyanates or a mixture of two or more such hydrocarbon radicals.

The following compounds, for example, are suitable for use in component C: $H_2N$—$(CH_2)_3$—$Si(O$—$C_2H_5)_3$, HO—$CH(CH_3)$—$CH_{2-Si(O-CH3)_3}$, HO—$(CH_2)_3$—$Si(O$—$CH_3)_3$, HO—$CH_2$—$CH_2$—O—$CH_2$—$CH_2$—$Si(O$—$CH_3)_3$, (HO—$C_2H_4)_2N$—$(CH_2)_3$—$Si(O$—$CH_3)_3$, HO—$(C_2H_4$—$O)_3$—$C_2H_4$—$N(CH_3)$—$(CH_2)_3$—$Si(O$—$C_4H_9)_3$, $H_2N$—$CH_2$—$C_6H_4$—$CH_2$—$CH_2$—$Si(O$—$CH_3)_3$, HS—$(CH_2)_3$—$Si(O$—$CH_3)_3$, $H_2N$—$(CH_2)_3$—NH—$(CH_2)_3$—$Si(O$—$CH_3)_3$, $H_2N$—$CH_2$—$CH_2$—NH—$(CH_2)_2$—$Si(OCH_3)_3$, $H_2N$—$(CH_2)_2$—NH—$(CH_2)_3$—$Si(O$—$CH_3)_3$, HO—CH($C_2H_5$)—$CH_2$—$Si(O$—$CH_3)_3$, HO—$(CH_2)_3$—$Si(O$—$C_2H_5)_3$, HO—$CH_2$—$CH_2$—O—$CH_2$—$CH_2$—$Si(O$—$C_2H_5)_3$, (HO—$C_2H_4)_2N$—$(CH_2)_3$—$Si(O$—$C_2H_5)_3$, $H_2N$—$CH_2$—$C_2H_4$—$CH_2$—$CH_2$—$Si(O$—$C_2H_5)_3$, HS—$(CH_2)_3$—$Si(O$—$C_2H_5)_3$, $H_2N$—$(CH_2)_3$—NH—$(CH_2)_3$—$Si(O$—$C_2H_5)$, $H_2N$—$CH_2$—$CH_2$—NH—$(CH_2)_2$—$Si(O$—$C_2H_5)_3$, $H_2N$—$(CH_2)_2$—NH—$(CH_2)_3$—$Si(O$—$C_2H_5)_3$ and mixtures of two or more thereof.

Compounds containing at least one methoxy group or one ethoxy group at the silicon atom are preferably used, compounds containing two or three methoxy groups or two or three ethoxy groups or mixtures of methoxy and ethoxy groups being particularly preferred.

In one particular embodiment of the invention, 3-aminopropyl trimethoxysilane, 3-aminopropyl dimethoxymethyl silane, 3-aminopropyl triethoxysilane, 3-aminopropyl dimethoxyphenyl silane and 3-aminopropyl diethoxyethyl silane are used.

In one preferred embodiment of the invention, component C is used in such a quantity that its percentage content in the polyurethane according to the invention is less than about 3% by weight and, more particularly, about 0.5 to about 2.5% by weight, for example about 1.8 to about 2.2% by weight.

The polyurethane according to the invention may be produced both by a single-stage process and by a multistage process.

In the single-stage process, all the starting materials are first mixed in the presence of an organic solvent at a water content of less than about 0.5% by weight. The mixture is heated for about 1 to about 30 hours and, more particularly, for about 2 to about 4 hours to a temperature of about 80 to about 200° C. and, more particularly, to a temperature of about 100 to about 140° C. The reaction time may optionally be shortened by addition of catalysts. Suitable catalysts are, for example, tertiary amines such as, for example, triethyl amine, dimethyl benzyl amine, bis-dimethyl aminoethyl ether and bis-methyl aminomethyl phenol. Other particularly suitable catalysts are, for example, 1-methyl imidazole, 1-methyl-1-vinyl imidazole, 1-allyl imidazole, 1-phenyl imidazole, 1,2,4,5-tetramethyl imidazole, 1-(3-aminopropyl)-imidazole, pyrimidazole, 4-dimethyl aminopyridine (DMAP), 4-pyrrolidinopyridine, 4-morpholinopyridine and 4-methyl pyridine. Other suitable catalysts are, for example, organometallic compounds, such as iron, titanium or tin compounds, more particularly the 1,3-dicarbonyl compounds of iron or divalent or tetravalent tin, more particularly Sn(II) carboxylates and dialkyl Sn(IV) dicarboxylates or the corresponding dialkoxylates, for example dibutyl tin dilaurate, dibutyl tin diacetate, dioctyl tin diacetate, dibutyl tin maleate, tin(II) octoate, tin(II) phenolate and the acetyl acetonates of divalent and tetravalent tin.

However, the reaction is preferably carried but in the absence of a catalyst and optionally in the absence of solvent.

The multistage process is advantageously used above all in cases where component C is used in the production of the polymer according to the invention. In this case, an NCO-terminated prepolymer is initially prepared from components A and B in a suitable stoichiometric ratio by the process described above and can be reacted with other compounds, for example with component C, in a second stage.

The prepolymer is then reacted with component C at 50 to 120° C. in such a way that all or some of the NCO groups react with component C.

The polyurethane according to the invention has a viscosity of about 50,000 to about 700,000 mPas (Brookfield RVT, 23° C., spindle 7, 2.5 r.p.m.).

The polyurethane according to the invention may be put to its final use in the form hitherto described. In general, however, the polyurethane according to the invention is advantageously used in a preparation which contains other compounds, for example for adjusting viscosity or the properties of the material.

For example, the viscosity of the polyurethane according to the invention may be too high for certain applications. However, it has been found that the viscosity of the polyurethane according to the invention can generally be reduced in a simple and practical manner by using a "reactive diluent" without any significant adverse effect on the properties of the cured polyurethane.

Accordingly, the present invention also relates to a preparation containing a first polyurethane according to the invention as described in the foregoing and at least a second polyurethane containing at least one terminal group reactive to water, more particularly an NCO group or an alkoxysilane group or both, of which the molecular weight ($M_n$) is at most 10,000 and is lower by at least 3,000 and preferably by at least 5,000 than the molecular weight of the first polyurethane as a reactive diluent.

The reactive diluent preferably contains at least one functional group which is capable under the influence of moisture of entering into a chain-extending or crosslinking reaction with a reactive group of the first polyurethane according to the invention (reactive diluent). The at least one functional group may be any functional group capable of reacting by crosslinking or chain extension under the influence of moisture.

Suitable reactive diluents are any polymeric compounds which are miscible with the first polyurethane according to the invention and reduce its viscosity and which have hardly any effect on the material properties of the product formed after curing or crosslinking or at least do not adversely affect them to such an extent that the product becomes unusable. Suitable reactive diluents are, for example, polyesters, polyethers, polymers of compounds containing an olefinically unsaturated double bond or polyurethanes providing the requirements mentioned above are satisfied.

However, the reactive diluents are preferably polyurethanes containing at least one NCO group or alkoxysilane group as reactive group.

The reactive diluents may contain one or more functional groups although the number of functional groups is preferably between 1 and about 6 and more preferably between about 2 and about 4, for example about 3.

In one preferred embodiment, the viscosity of the reactive diluents is below about 20,000 mPas and, more particularly, in the range from about 1,000 to about 10,000, for example about 3,000 to about 6,000 mPas (Brookfield RVT, 23° C., spindle 7, 2.5 r.p.m.).

The reactive diluents suitable for use in the process according to the invention may have any molecular weight distribution (PD) and, accordingly, can be produced by any of the methods typically used in polymer chemistry.

Polyurethanes obtainable from a polyol component and an isocyanate component are preferably used as the reactive diluents.

In the context of the present invention, the term "polyol component" encompasses an individual polyol or a mixture of two or more polyols which may be used for the production of polyurethanes. A polyol is understood to be a polyhydric alcohol, i.e. a compound containing more than one OH group in the molecule.

A number of polyols may be used as the polyol component for producing the reactive diluent. They include, for example, aliphatic alcohols containing 2 to 4 OH groups per molecule. The OH groups may be both primary and secondary. Suitable aliphatic alcohols include, for example, ethylene glycol, propylene glycol, butane-1,4-diol, pentane-1,5-diol, hexane-1,6-diol, heptane-1,7-diol, octane-1,8-diol and higher homologs or isomers thereof which the expert can obtain by extending the hydrocarbon chain in steps, i.e. by one $CH_2$ group at a time, or by introducing branches into the carbon chain. Also suitable are higher alcohols such as, for example, glycerol, trimethylol propane, pentaerythritol and oligomeric ethers of the substances mentioned either on their own or in the form of mixtures of two or more of the ethers mentioned with one another.

Other suitable polyol components for producing the reactive diluents are the reaction products of low molecular weight polyhydric alcohols with alkylene oxides, so-called polyethers. The alkylene oxides preferably contain 2 to 4 carbon atoms. Suitable reaction products are, for example, those of ethylene glycol, propylene glycol, the isomeric butane diols or hexane diols with ethylene oxide, propylene oxide and/or butylene oxide. Other suitable reaction products are those of polyhydric alcohols, such as glycerol, trimethylol ethane and/or trimethylol propane, pentaerythritol or sugar alcohols, with the alkylene oxides mentioned to form polyether polyols. Polyether polyols with a molecular weight of about 100 to about 10,000 and preferably in the range from about 200 to about 5,000 are particularly suitable. Polypropylene glycol with a molecular weight of about 300 to about 2,500 is most particularly preferred. Polyether polyols obtainable for example by the polymerization of tetrahydrofuran are also suitable as polyol component for the production of component A.

As already described, the polyethers are obtained by reaction of the starter compound containing a reactive hydrogen atom with alkylene oxides, for example ethylene oxide, propylene oxide, butylene oxide, styrene oxide, tetrahydrofuran or epichlorohydrin or mixtures of two or more thereof.

As already mentioned, suitable starter compounds are, for example, water, ethylene glycol, 1,2- or 1,3-propylene glycol, 1,4- or 1,3-butylene glycol, hexane-1,6-diol, octane-1,8-diol, neopentyl glycol, 1,4-hydroxymethyl cyclohexane and also 2-methylpropane-1,3-diol, glycerol, trimethylol propane, hexane-1,2,6-triol, butane-1,2,4-triol, trimethylol ethane, pentaerythritol, mannitol, sorbitol, methyl glycoside, sugar, phenol, isononyl phenol, resorcinol, hydroquinine, 1,2,2- or 1,1,2-tris-(hydroxyphenyl)-ethane, ammonia, methyl amine, ethylene diamine, tetra- or hexamethylene amine, triethanolamine, aniline, phenylene diamine, 2,4- and 2,6-diaminotoluene and polyphenyl polymethylene polyamines obtainable by condensing aniline with formaldehyde.

Polyethers which have been modified by vinyl polymers are also suitable for use as the polyol component. Products such as these are obtainable, for example, by polymerizing styrene and/or acrylonitrile in the presence of polyethers.

Polyester polyols with a molecular weight of about 200 to about 5,000 are also suitable as polyol component for the production of the reactive diluent. For example, polyester polyols obtainable by the above-described reaction of low molecular weight alcohols, more particularly ethylene glycol, diethylene glycol, neopentyl glycol, hexanediol, butanediol, propylene glycol, glycerol or trimethylol propane, with caprolactone may be used. As already mentioned, other polyhydric alcohols suitable for the production of polyester polyols are 1,4-hydroxymethyl cyclohexane, 2-methylpropane-1,3-diol, butane-1,2,4-triol, triethylene glycol, tetraethylene glycol, polyethylene glycol, dipropylene glycol, polypropylene glycol, dibutylene glycol and polybutylene glycol.

As described above, other suitable polyester polyols can be obtained by polycondensation. Thus, dihydric and/or trihydric alcohols can be condensed with less than the equivalent quantity of dicarboxylic acids and/or tricarboxylic acids or reactive derivatives thereof to form polyester polyols. Suitable dicarboxylic acids and tricarboxylic acids and suitable alcohols were mentioned in the foregoing.

According to the invention, polyols used with particular preference as the polyol component for producing the reactive diluents are, for example, dipropylene glycol and/or polypropylene glycol with a molecular weight of about 400 to about 2,500 and polyester polyols, preferably polyester polyols obtainable by polycondensation of hexanediol, ethylene glycol, diethylene glycol or neopentyl glycol or mixtures of two or more thereof and isophthalic acid or adipic acid or mixtures thereof.

Another suitable polyol component for producing the reactive diluents are polyacetals. Polyacetals are compounds obtainable from glycols, for example diethylene glycol or hexanediol, with formaldehyde. Polyacetals suitable for use in accordance with the present invention may also be obtained by the polymerization of cyclic acetals.

Polycarbonates are also suitable as polyols for producing the reactive diluents. Polycarbonates may be obtained, for example, by reaction of diols, such as propylene glycol, butane-1,4-diol or hexane-1,6-diol, diethylene glycol, triethylene glycol or tetraethylene glycol or mixtures of two or more thereof, with diaryl carbonates, for example, diphenyl carbonate, or phosgene.

Polyacrylates containing OH groups are also suitable as polyol component for producing the reactive diluents. These polyacrylates may be obtained, for example, by the polymerization of ethylenically unsaturated monomers containing an OH group. Such monomers are obtainable, for example, by the esterification of ethylenically unsaturated carboxylic acid and dihydric alcohols, the alcohol generally being present in a slight excess. Ethylenically unsaturated carboxylic acids suitable for this purpose are, for example, acrylic acid, methacrylic acid, crotonic acid or maleic acid. Corresponding OH-functional esters are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

To produce the preferred reactive diluents according to the invention, the corresponding polyol component is reacted with an at least difunctional isocyanate. Basically, the at least difunctional isocyanate used for the production of component A may be any isocyanate containing at least two isocyanate groups, although compounds containing two to four isocyanate groups and more particularly two isocyanate groups are preferred for the purposes of the invention.

The polyisocyanates mentioned above are particularly suitable for the production of the reactive diluents.

The compound present as reactive diluent in accordance with the present invention preferably contains at least one isocyanate group or an alkoxysilane group, preferred alkoxysilane groups being dialkoxy and trialkoxysilane groups.

Under certain conditions, it can be of advantage for the functional groups of the reactive diluent to differ in their reactivity to moisture or to the particular hardener used from the functional groups of the first polyurethane with the higher molecular weight. For example, it may be desirable for the reactive diluent to react more slowly than the first polyurethane in order to maintain the diluting effect for as long as possible. If the first polyurethane contains one or more terminal alkoxysilane groups, the reactivity of the terminal groups of the reactive diluent can be controlled, for example, by using other alkoxy groups than in the terminal groups of the first polyurethane. If, for example, methoxy groups are present in the terminal groups of the first polyurethane, the reactivity of the reactive diluent thereto can be reduced by using alkoxysilane groups containing alkoxy groups with two or more carbon atoms as the reactive groups. The reactivity of the reactive diluent can also be controlled to the extent that it crosslinks or cures more quickly than the first polymer and, hence, frequently contributes for example towards an improvement in storage stability.

In one preferred embodiment of the invention, the reactive diluent contains a terminal group corresponding to general formula I, where $R^1$, $R^2$ and $R^3$ are as already defined, as at least one terminal group reactive to water.

The production of the reactive diluents preferably used for the purposes of the present invention may be carried out, for example, similarly to the above-described production of the first polyurethane. A prepolymer terminated by one or more NCO groups is first prepared from the isocyanate component and the polyol component and is subsequently reacted with suitable alkoxysilanes to form the preferred reactive diluents. Suitable alkoxysilanes are, in particular, the alkoxysilanes described above which are suitable, for example, for use in component C.

The preparation according to the invention contains the first polyurethane and the reactive diluent or a mixture of two or more reactive diluents in general in such a ratio that the preparation has a viscosity of at most 200,000 mPas (Brookfield RVT, 23° C., spindle 7, 2.5 r.p.m.). A percentage content of reactive diluent (including a mixture of two or more reactive diluents), based on the preparation as a whole, of about 1% by weight to about 70% by weight and, more particularly, about 5% by weight to about 25% by weight is generally suitable for this purpose.

Instead of or in addition to a reactive diluent, a plasticizer may also be used to reduce the viscosity of the polyurethane according to the invention. "Plasticizers" in the context of the present invention are compounds which are inert to the first polyurethane and which reduce the viscosity of a preparation containing a polyurethane according to the invention or a mixture of two or more polyurethanes according to the invention.

Suitable plasticizers are, for example, esters, such as abietic acid esters, adipic acid esters, azelaic acid esters, benzoic acid esters, butyric acid esters, acetic acid esters, esters of higher fatty acids containing about 8 to about 44 carbon atoms, esters of OH-functional or epoxidized fatty acids, fatty acid esters and fats, glycolic acid esters, phosphoric acid esters, phthalic acid esters of linear or branched $C_{1-12}$ alcohols, propionic acid esters, sebacic acid esters, sulfonic acid esters, thiobutyric acid esters, trimellitic acid esters, citric acid esters and nitrocellulose- and polyvinyl acetate-based esters and mixtures of two or more thereof. The asymmetrical esters of dibasic aliphatic dicarboxylic acids, for example the esterification product of adipic acid monooctyl ester with 2-ethylhexanol (Edenol DOA, a product of Henkel, Düsseldorf), are particularly suitable.

Other suitable plasticizers are the pure or mixed ethers of monohydric, linear or branched $C_{4-16}$ alcohols or mixtures of two or more different ethers of such alcohols, for example dioctyl ethers (obtainable as CETIOL OE, a product of Henkel, Düsseldorf).

In another preferred embodiment, end-capped polyethylene glycols, for example polyethylene or polypropylene glycol di-$C_{1-4}$-alkyl ethers, more particularly the dimethyl or diethyl ether of diethylene glycol or dipropylene glycol, and mixtures of two or more thereof, are used as plasticizers.

According to the invention, diurethanes are also suitable plasticizers. Diurethanes may be obtained, for example, by reaction of OH-terminated diols with monofunctional isocyanates, the stoichiometry being selected so that substantially all free OH groups react off. Any excess isocyanate may then be removed from the reaction mixture, for example by distillation. Another method of producing diurethanes comprises reacting monohydric alcohols with diisocyanates, all the NCO groups reacting off.

To produce the diurethanes based on diols, diols containing 2 to about 22 carbon atoms may be used. Examples of such diols include ethylene glycol, propylene glycol, propane-1,2-diol, dibutanediol, hexanediol, octanediol or technical mixtures of hydroxyfatty alcohols containing about 14 carbon atoms, more particularly hydroxystearyl alcohol. Linear diol mixtures, particularly those containing polypropylene glycol with an average molecular weight ($M_n$) of about 1,000 to about 6,000 in quantities of more than about 50% by weight and, more particularly, more than about 70% by weight are preferred. Diurethanes based solely on propylene glycol with the same or different average molecular weights of about 1,000 to about 4,000 are most particularly preferred. Substantially all the free OH groups of the diol mixtures are reacted off with aromatic or aliphatic monoisocyanates or mixtures thereof. Preferred monoisocyanates are phenyl isocyanate or toluene isocyanate or mixtures thereof.

To produce the diurethanes based on diisocyanates, aromatic or aliphatic diisocyanates or mixtures thereof are used. Suitable aromatic or aliphatic diisocyanates are, for example, the isocyanates mentioned above as suitable for the production of the polyurethane according to the invention, preferably toluene diisocyanate (TDI). The free NCO groups of the diisocyanates are reacted substantially completely with monohydric alcohols, preferably linear monohydric alcohols or mixtures of two or more different monohydric alcohols. Mixtures of linear monohydric alcohols are particularly suitable. Suitable monoalcohols are, for example, monoalcohols containing 1 to about 24 carbon atoms, for example methanol, ethanol, the position isomers of propanol, butanol, pentanol, hexanol, heptanol, octanol, decanol or dodecanol, more particularly the respective 1-hydroxy compounds, and mixtures of two or more thereof. So-called "technical mixtures" of alcohols and end-capped polyalkylene glycol ethers are also suitable. Alcohol mixtures containing polypropylene glycol monoalkyl ethers with an average molecular weight ($M_n$) of about 200 to about 2,000 in a quantity of more than about 50% by weight and preferably more than about 70% by weight, based on the alcohol mixtures, are particularly suitable. Diurethanes based on diisocyanates of which the free NCO groups have been completely reacted with polypropylene glycol monoalkyl ethers having an average molecular weight of about 500 to about 2,000 are particularly preferred.

The preparation according to the invention generally contains the plasticizers mentioned in such a quantity that the preparation has a viscosity of at most about 200,000 mPas (Brookfield RVT, 23° C., spindle 7, 2.5 r.p.m.).

Taking into account the various polyurethanes which may be present in the preparation, different quantities of plasticizer may be necessary to achieve the stated viscosity. In general, however, the required viscosity can be achieved by adding about 1 to about 30% by weight of plasticizer, based on the preparation. Any increase in the quantity of plasticizer generally leads to a further reduction in viscosity.

The preparation according to the invention may contain the reactive diluents or the plasticizers individually or in the form of mixtures.

Besides reactive diluents and plasticizers, the preparation according to the invention may contain other additives which are generally intended to modify certain material properties of the preparation before or after processing or which promote the stability of the preparation before or after processing Accordingly, the present invention also relates to a preparation containing a polyurethane according to the invention or a mixture of two or more thereof and a reactive diluent or a plasticizer or a mixture thereof and one or more compounds selected from the group consisting of moisture stabilizers, antioxidants, catalysts, tackifiers, fillers and UV stabilizers.

In many cases, it is appropriate to stabilize the preparations according to the invention against penetrating moisture in order to increase their shelf life. Such an improvement in shelf life can be obtained, for example, by using moisture stabilizers. Suitable moisture stabilizers are any compounds which react with water to form a group inert to the reactive groups present in the preparation, but which at the same time undergo only minimal changes in their molecular weight. In addition, the reactivity of the stabilizers to moisture which has penetrated into the preparation must be higher than the reactivity of the terminal groups of the polyurethane according to the invention present in the preparation or the mixture of two or more such polyurethanes.

Suitable moisture stabilizers are, for example, isocyanates.

In one preferred embodiment, however, the moisture stabilizers used are silanes, for example vinyl silanes, such as 3-vinylpropyl triethoxysilane, oxime silanes, such as methyl-O,O',O"-butan-2-one trioxime silane or O,O',O", O'"-butan-2-one tetraoxime silane (CAS No. 022984-54-9 and 034206-40-1), or benzamidosilanes, such as bis-(N-methylbenzamido)-methyl ethoxysilane (CAS No. 16230-35-6).

Other moisture stabilizers are the above-mentioned reactive diluents providing they have a molecular weight ($M_n$) of less than about 5,000 and contain terminal groups of which the reactivity to moisture which has penetrated into the preparation is at least as high as and preferably higher than the reactivity of the reactive groups of the polyurethane according to the invention.

The preparation according to the invention generally contain about 0 to about 6% by weight of moisture stabilizers.

The preparation according to the invention may additionally contain up to about 7% by weight and, more particularly, about 3 to about 5% by weight of antioxidants.

The preparation according to the invention may additionally contain up to about 5% by weight of catalysts to control the cure rate. Suitable catalysts are, for example, organometallic compounds, such as iron or tin compounds, more particularly the 1,3-dicarbonyl compounds of iron or divalent or tetravalent tin, more particularly Sn(II) carboxylates or dialkyl Sn(IV) dicarboxylates and the corresponding dialkoxylates, for example dibutyl tin dilaurate, dibutyl tin diacetate, dioctyl tin diacetate, dibutyl tin maleate, tin(II) octoate, tin(II) phenolate or the acetyl acetonates of divalent or tetravalent tin. Other suitable catalysts are the abovementioned amines which may be used in the actual production of the polyurethane according to the invention.

If it is to be used as an adhesive, the preparation according to the invention may contain up to about 30% by weight of typical tackifiers. Suitable tackifiers are, for example, resins, terpene oligomers, couramone/indene resins, aliphatic petrochemical resins and modified phenolic resins.

The preparation according to the invention may contain up to about 80% by weight of fillers. Suitable fillers are, for example, inorganic compounds inert to isocyanates and silanes, such as chalk, lime flour, precipitated silica, pyrogenic silica, zeolites, bentonites, ground minerals, glass beads, glass powder, glass fibers and chopped strands and other inorganic fillers known to the expert and also organic fillers, more particularly short-staple fibers or hollow plastic beads. Fillers which make the preparation thixotropic, for example swellable plastics, such as PVC, may also be used.

The preparation according to the invention may contain up to about 2% by weight and preferably about 1% by weight of UV stabilizers. Particularly suitable UV stabilizers are the so-called hindered amine light stabilizers (HALS). A preferred embodiment of the present invention is characterized by the use of a UV stabilizer which contains a silane group and which is incorporated in the end product during crosslinking or curing.

The products Lowilite 75 and Lowilite 77 (Great Lakes, USA) are particularly suitable for this purpose.

The present invention also relates to a preparation containing about 10% by weight to about 100% by weight of a polyurethane according to the invention or a mixture of two or more polyurethanes according to the invention, about 0% by weight to about 70% by weight of a reactive diluent or a mixture of two or more reactive diluents, about 0% by weight to about 30% by weight of a plasticizer or a mixture of two or more plasticizers, about 0% by weight to about 5% by weight of a moisture stabilizer or a mixture of two more moisture stabilizers, about 0% by weight to about 30% by weight of a tackifier or a mixture of two or more tackifiers, about 0% by weight to about 5% by weight of a UV stabilizer or a mixture of two or more UV stabilizers, about 0% by weight to about 5% by weight of a catalyst or a mixture of two or more catalysts and about 0% by weight to about 80% by weight of a filler or a mixture of two or more fillers.

The polyurethanes according to the invention and the preparations according to the invention are suitable for a broad range of applications in the field of adhesives and sealants. The preparations according to the invention are particularly suitable, for example, as contact adhesives, one-component adhesives, two-component adhesives, assembly adhesives, sealing compounds, more particularly jointing compounds, and for surface sealing.

Accordingly, the present invention also relates to the use of a polyurethane according to the invention or a preparation according to the invention as an adhesive, sealing compound, surface coating composition, stopping compound or for the production of molded articles.

The polyurethanes according to the invention or the preparations according to the invention are suitable, for example, as an adhesive for plastics, metals, mirrors, glass, ceramics, mineral substrates, wood, leather, textiles, paper, paperboard and rubber. The materials may be bonded either to materials of the same type or to materials of different types.

The polyurethanes according to the invention or the preparations according to the invention are also suitable, for example, as a sealant for plastics, metals, mirrors, glass, ceramics, mineral substrates, wood, leather, textiles, paper, paperboard and rubber. The materials may be sealed to materials of the same type or to materials of different types.

In addition, the polyurethanes according to the invention or the preparations according to the invention are suitable, for example, as surface coating compositions for surfaces of plastic, metal, glass, ceramic, minerals, wood, leather, textiles, paper, paperboard and rubber.

The polyurethanes according to the invention or the preparations according to the invention are also suitable for the production of moldings of any three-dimensional form.

Another application for the polyurethanes according to the invention or the preparations according to the invention is their use as a dowel, hole or crack filling composition.

In all the applications mentioned above, the polyurethanes according to the invention or the preparations according to the invention may be used as a one-component system, i.e. as a moisture-curing system, or as a two-component system, in which case the second component contains water for example.

The invention is illustrated by the following Examples.

EXAMPLE 1

Production of a Silane-terminated Polyurethane 2.35 g of TDI and 96 g of polypropylene glycol with a molecular weight $M_n$ of 12,000, a PD of 1.12 and an OH functionality of 1.98 were introduced into a flask at room temperature together with 0.01 g of dibutyl tin dilaurate and heated with stirring to 75° C. After 2 hours, the contents of the flask were cooled to 60° C. and 1.6 g of 3-aminopropyl trimethoxysilane were added. After stirring for another 10 minutes, the warm reaction mixture was packed in hermetically sealable vessels.

EXAMPLE 2

Production of a Jointing Compound

In a vacuum planetary dissolver, 29 parts of the polyurethane of Example 1 were stirred with 3 parts of vinyl trimethoxysilane at room temperature. 42 Parts of chalk, 6 parts of titanium dioxide, 0.3 part of benztriazole and 0.3 part of TINUVIN-765 (Ciba Geigy) were then added to the mixture, followed by stirring in vacuo (25 mbar) at 2,000 to 3,000 r.p.m. until a homogeneous smooth paste was formed. The paste was then stirred in vacuo with 0.2 part of 1-dodecylamine, 1 part of 3-aminopropyl trimethoxysilane and 0.1 part of dibutyl tin dilaurate and packed in a commercial cartridge for jointing compounds.

Comparison Example 1

Production of a Silane-terminated Polyurethane

The procedure was as described in Example 1 except that the polypropylene mentioned in that Example was replaced by a polypropylene having a molecular weight $M_n$ of 4,000, a greater polydispersity and a lower OH functionality.

Comparison Example 2
Production of a Jointing Compound

The procedure was as described in Example 2 using the polyurethane of Comparison Example 1 as the polyurethane.

Testing of Breaking Elongation and Breaking Force

The jointing compounds of Example 2 and Comparison Example 2 were subjected to breaking force and breaking elongation tests to DIN EN 29046 5/91.

|  | Comparison Example 2 | Example 2 |
| --- | --- | --- |
| Breaking elongation | 89% | 276% |
| Breaking force [N/mm$^2$] | 0.39 | 0.49 |

What is claimed is:

1. A polyurethane obtained by reacting Component A, Component B, and Component C wherein Component A comprises at least one polyisocyanate, Component B comprises at least one polyether with a number average molecular weight of at least 4000 and possessing at least one of characteristics (a) or (b):

(a) a polydispersity of less than 1.5; or (b) an average OH functionality of about 1.8 to about 2.0, wherein said polyurethane has at least one water-reactive terminal group corresponding to general formula I:

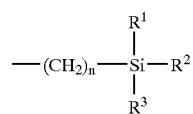

in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group and n is an integer of 1 to 8, and Component C comprises one or more compounds corresponding to general formula II:

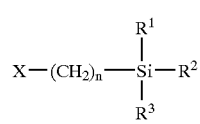

in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group, X is a group reactive to an isocyanate group or X is a glycidyl group, and n is a number of 1 to 8.

2. The polyurethane of claim 1 wherein said at least one polyether comprises at least 90% by weight of Component B.

3. The polyurethane of claim 1 wherein said polyurethane has at least one terminal isocyanate group.

4. The polyurethane of claim 1 wherein said at least one polyether has a polydispersity of less than 1.5 and an OH functionality of about 1.8 to about 2.0.

5. The polyurethane of claim 1 wherein Component A comprises at least one polyisocyanate selected from TDI or MDI.

6. The polyurethane of claim 1 wherein said at least one polyether has a polydispersity of from about 1.01 to about 1.3.

7. The polyurethane of claim 1 wherein said at least one polyether has an OH functionality of about 1.93 to about 2.0.

8. The polyurethane of claim 1 wherein said at least one polyether has a content of primary OH groups of 20% or below.

9. The polyurethane of claim 1 wherein said polyurethane has a number average molecular weight of from about 20,000 to about 40,000.

10. A preparation comprised of (I) at least 10% by weight of one or more polyurethanes in accordance with claim 1; and (II) at least one of additional components (a)–(g):

(a) 0% by weight to 70% by weight of one or more reactive diluents;

(b) 0% by weight to 30% by weight of one or more plasticizers;

(c) 0% by weight to 5% by weight of one or more moisture stabilizers;

(d) 0% by weight to 30% by weight of one of more tackifiers;

(e) 0% by weight to 5% by weight of one or more UV stabilizers;

(f) 0% by weight to 5% by weight of one or more catalysts; or (g) 0% by weight to 80% by weight of one or more fillers.

11. A polyurethane having a number average molecular weight of about 20,000 to about 40,000 obtained by reacting Component A, Component B, and Component C, wherein Component A comprises at least one polyisocyanate selected from the group consisting of TDI and MDI, wherein at least 80% by weight of Component B is comprised of at least one polyether with a number average molecular weight of about 6000 to about 20,000, a polydispersity of about 1.01 to about 1.3, a content of primary OH groups less than 15%, and an average OH functionality of about 1.95 to about 2.0, and wherein the polyurethane has at least one water-reactive terminal group corresponding to general formula I:

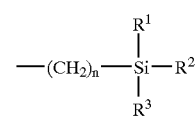

in which $R^1$ and $R^2$ are the same or different and, independently of one another, represent a linear or branched $C_{1-10}$ alkyl group or have the same meaning as $R^3$ and $R^3$ is a linear or branched $C_{1-8}$ alkoxy group or $C_{1-8}$ acyloxy group, and n is an integer of 1 to 8, and Component C comprises one or more compounds corresponding to general formula II:

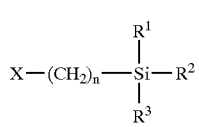

in which $R^1$ and $R^2$ are the same or different and, independently of one another, represent a linear or branched $C_{1-10}$ alkyl group or have the same meaning as $R^3$, and $R^3$ is a linear or branched $C_{1-8}$ alkoxy group or $C_{1-8}$ acyloxy group, X is a group reactive to an isocyanate group or X is a glycidyl group, and n is a number of 1 to 8.

12. A preparation comprised of:
(I) at least 10% by weight of one or more polyurethanes in accordance with claim 36; and
(II) at least one of additional components (a)–(g):
   a) 0% by weight to 70% by weight of one or more reactive diluents;
   b) 0% by weight to 30% by weight of one or more plasticizers;
   c) 0% by weight to 5% by weight of one or more moisture stabilizers;
   d) 0% by weight to 30% by weight of one or more tackifiers;
   e) 0% by weight to 5% by weight of one or more UV stabilizers;
   f) 0% by weight to 5% by weight of one or more catalysts; or
   g) 0% by weight to 80% by weight of one or more fillers;
   wherein said preparation has a viscosity not in excess of 200,000 mPas, as measured by Brookfield RVT (23° C., spindle 7, 2.5 rpm).

13. A preparation comprised of a first polyurethane and a reactive diluent, said first polyurethane being obtained by reacting Component A and Component B, wherein Component A comprises at least one polyisocyanate and Component B comprises at least one polyether with a number average molecular weight of at least 4000 and possessing at least one of characteristics (a) or (b):
   (a) a polydispersity of less than 1.5 or
   (b) an average OH functionality of about 1.8 to about 2.0;
wherein said polyurethane has at least one water-reactive terminal group corresponding to general formula I:

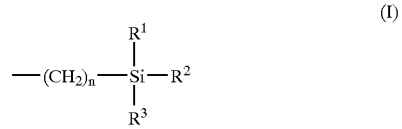

(I)

in which $R^1$ and $R^2$ are the same or different and, independently of one another, represent a linear or branched $C_{1\text{-}10}$ alkyl group or have the same meaning as $R^3$, $R^3$ is a linear or branched $C_{1\text{-}8}$ alkoxy group or $C_{1\text{-}8}$ acyloxy group and n is an integer of 1 to 8, and said reactive diluent being a second polyurethane having at least one water-reactive terminal group and a number average molecular weight not in excess of 8,000 and at least 3,000 lower than the number average molecular weight of said first polyurethane.

14. The preparation of claim 13 wherein the second polyurethane has a water-reactive terminal group corresponding to general formula I:

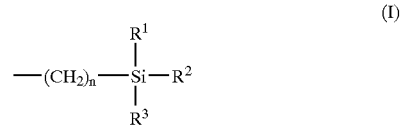

(I)

in which $R^1$ and $R^2$ are the same or different and, independently of one another, represent a linear or branched $C_{1\text{-}10}$ alkyl group or have the same meaning as $R^3$ and $R^3$ is a linear or branched $C_{1\text{-}8}$ alkoxy group or $C_{1\text{-}8}$ acyloxy group, and n is an integer of 1 to 8.

15. The preparation of claim 13 wherein the reactive diluent is between 1% by weight and 70% by weight of the preparation.

16. The preparation of claim 13 wherein said preparation has a viscosity of at most 200,000 mPas, as measured using a Brookfield RVT (23° C., spindle 7, 2.5 rpm).

17. The preparation of claim 13 wherein said preparation is additionally comprised of at least one compound selected from the group consisting of plasticizers, moisture stabilizers, antioxidants, catalysts, hardeners, fillers and UV stabilizers.

18. The preparation of claim 13 wherein said preparation is comprised of a UV stabilizer having an alkoxysilane group which is covalently bonded under the influence of moisture to one or both of said first and second polyurethanes.

19. A preparation of claim 13 additionally comprised of a plasticizer inert to said first polyurethane.

20. The preparation of claim 19 wherein said preparation has a viscosity of at most 200,000 mPas, as measured using a Brookfield RVT (23° C., spindle 7, 2.5 rpm).

21. The preparation of claim 19 wherein said preparation is additionally comprised of at least one compound selected from the group consisting of moisture stabilizers, antioxidants, catalysts, hardeners, fillers and UV stabilizers.

22. The preparation of claim 19 wherein said preparation is comprised of a UV stabilizer having an alkoxysilane group which is covalently bonded under the influence of moisture to said first polyurethane.

* * * * *

UNITED STATES PATENT AND TRADEMARK OFFICE
CERTIFICATE OF CORRECTION

PATENT NO. : 6,884,852 B1
DATED : April 26, 2005
INVENTOR(S) : Klauck et al.

It is certified that error appears in the above-identified patent and that said Letters Patent is hereby corrected as shown below:

Title page,
Item [56], References Cited, U.S. PATENT DOCUMENTS, add the following:
-- 4,599,260   7/1986      Truskolawaski et al.
   4,612,052   9/1986      Schwartz
   4,074,163   11/1987     Baratto et al.
   4,825,763   6/1989      Truskolaski et al.
   4,983,664   1/1991      Truskolaski et al.
   6,013,342   1/2000      Neto
   6,133,398   10/2000     Bhat et al.
   6,617,031   9/2003      Glasbrenner et al. --.
FOREIGN PATENT DOCUMENTS, add the following:
-- CL   36516   8/1989 --.

Signed and Sealed this

Eleventh Day of October, 2005

JON W. DUDAS
*Director of the United States Patent and Trademark Office*

(12) EX PARTE REEXAMINATION CERTIFICATE (7418th)
United States Patent
Klauck et al.

(10) Number: US 6,884,852 C1
(45) Certificate Issued: Mar. 23, 2010

(54) POLYURETHANE AND PREPARATION CONTAINING POLYURETHANE

(76) Inventors: Wolfgang Klauck, Dresdener Strasse 12, 40670 Meerbusch (DE); Lydia Duhm, Haus-Endt-Strasse 78, 40593 Duesseldorf (DE); Martin Majolo, St. Martinus-Strasse 33, 41812 Erkelenz (DE)

Reexamination Request:
No. 90/010,122, Mar. 13, 2008

Reexamination Certificate for:
Patent No.: 6,884,852
Issued: Apr. 26, 2005
Appl. No.: 09/646,813
Filed: Nov. 27, 2000

Certificate of Correction issued Oct. 11, 2005.

(22) PCT Filed: Mar. 17, 1999
(86) PCT No.: PCT/EP99/01728
§ 371 (c)(1), (2), (4) Date: Nov. 27, 2000
(87) PCT Pub. No.: WO99/48942
PCT Pub. Date: Sep. 30, 1999

(51) Int. Cl.
*C08G 18/48* (2006.01)
*C08G 18/00* (2006.01)
*C08G 18/10* (2006.01)

(52) U.S. Cl. .................. 525/458; 525/457; 525/460; 528/28; 528/76

(58) Field of Classification Search ............ None
See application file for complete search history.

(56) References Cited

U.S. PATENT DOCUMENTS

| | | | |
|---|---|---|---|
| 3,971,751 A | 7/1976 | Isayama et al. | |
| 4,622,369 A | 11/1986 | Chang et al. | |
| 4,645,816 A | 2/1987 | Pohl et al. | |
| 4,687,851 A | 8/1987 | Laughner | |
| 6,001,946 A | 12/1999 | Waldman et al. | |
| 6,420,455 B1 | 7/2002 | Landgrebe et al. | |

FOREIGN PATENT DOCUMENTS

| | | |
|---|---|---|
| BR | 9 704 796 | 12/1998 |
| CA | 2072751 | 6/1991 |
| CA | 2191994 | 12/1995 |
| CL | 1615-95 | 10/1995 |
| CL | 1615-95 | 6/1996 |
| CL | 38-97 | 1/1997 |
| CL | 944-97 | 5/1997 |
| EP | 0 531 969 | 3/1993 |
| EP | 0 169 536 | 5/1994 |
| EP | 0 918 062 | 5/1999 |
| EP | 0 931 800 | 7/1999 |
| EP | 0 676 403 | 9/1999 |
| EP | 0 831 108 B1 | 4/2004 |
| WO | WO 92/05212 | 4/1992 |
| WO | WO98/02475 | 1/1998 |
| WO | WO 99/29752 | 6/1999 |

OTHER PUBLICATIONS

S.D. Seneker et al., New Higher–Reactivity, Ultra–Low Monol PPG Polyols with High–Performance Characteristics, Polyurethanes World Congress 1997, pp. 568–579.
N. Barksby et al., Acclaim Polyether Polyols for Cast Elastomers, ARCO Chemical Company, pp. 1–22, Nov. 1995, Pittsburgh, PA.
N. Barksby et al., Novel Polyether Polyols Yield High–Performance Cast Elastomers, Urethanes Technology, Feb./Mar. 1996, pp. 36–44, vol. 13, No. 1, Crain Communications, 1996.
B.D. Lawrey et al., High Performance Moisture–Cured Systems Based on ACCLAIM Polyether Polyols, pp. 83–101.
B.D. Lawrey et al., Improved Processability and Performance in MDI Elastomers Based on Ultra–Low Monol Polyols, Polyurethanes Expo 2003, pp. 260–267.
ACCLAIM Polyol 12200, ARCO Chemical Company 1995, U.S.A.
ARCO Chemical Co. Product Brochure for ACCLAIM Polyols 2200, 3201, 4200, 6300, and 8200.
O'Sickey et al., Structure–Property Relationships of Poly(urethane–urea)s with Ultralow Monol Content Poly(propylene glycol) Soft Segments. III., Journal of Applied Polymer Science, 2003, vol. 89, pp. 3520–3529, Wiley Periodicals, Inc. 2003.
Murahashi et al., Polymer Chemistry, 1993, pp. 152–153, 4$^{th}$ Edition.
Examination Report on Patent Application for Chilean Application No. CL 503–99.

*Primary Examiner*—Brenda Brumback

(57) ABSTRACT

A polyurethane is produced by reacting at least components A and B, where a) a polyisocyanate or mixture of polyisocyanates is used as component A and b) a polyol or mixture of polymer is used as component B. Component B contains at least one polyether having a number average molecular weight of at least 4000 and a polydispersity of less than 1.5 and/or an OH functionality of between about 1.8 and about 2. Preparations containing such polyurethanes are useful as adhesives, coatings and sealants.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 9 is cancelled.

Claim 1 is determined to be patentable as amended.

Claims 2, 5, 7 and 10, dependent on an amended claim, are determined to be patentable.

New claim 23 is added and determined to be patentable.

Claims 3, 4, 6, 8, 9 and 11–22 were not reexamined.

1. A polyurethane *having a number average molecular weight of from about 20,000 to about 40,000* obtained by reacting Component A, Component B, and Component C wherein Component A comprises at least one polyisocyanate, Component B comprises at least one polyether with a number average molecular weight of [at least 4000] *11,000–15,000* and possessing at least one of characteristics (a) or (b): (a) a polydispersity of less than 1.5; or (b) an average OH functionality of about 1.8 to about 2.0, wherein said polyurethane has at least one water-reactive terminal group corresponding to general formula I:

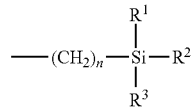

in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group and n is an integer of 1 to 8, and Component C comprises one or more compounds corresponding to general formula II:

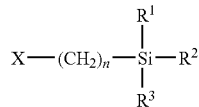

in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group, X is a group reactive to an isocyanate group or X is a glycidyl group, and n is a number of 1 to 8.

23. *A polyurethane having a number average molecular weight of from about 20,000 to about 40,000 obtained by reacting Component A, Component B, and Component C wherein Component A comprises at least one polyisocyanate, Component B comprises at least one polyether with a number average molecular weight of 11,000–15,000 and possessing (a) a polydispersity of less than 1.5; or (b) an average OH functionality of about 1.8 to about 2.0, wherein said polyurethane has at least one water-reactive terminal group corresponding to general formula I:*

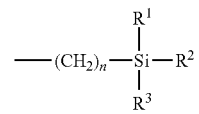

*in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group and n is an integer of 1 to 8, and Component C comprises one or more compounds corresponding to general formula II:*

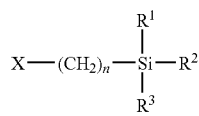

*in which $R^1$ and $R^2$ are the same or different and, independently of one another, represent a linear or branched $C_{1-10}$ alkyl group or have the same meaning as $R^3$, $R^3$ is a linear or branched $C_{1-8}$ alkoxy group or $C_{1-8}$ acyloxy group, X is a group reactive to an isocyanate group or X is a glycidyl group, and n is a number of 1 to 8.*

\* \* \* \* \*